(12) United States Patent
Yamauchi

(10) Patent No.: US 9,522,576 B2
(45) Date of Patent: Dec. 20, 2016

(54) PNEUMATIC RADIAL TIRE

(71) Applicant: BRIDGESTONE CORPORATION, Chuo-ku, Tokyo (JP)

(72) Inventor: Kei Yamauchi, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 176 days.

(21) Appl. No.: 14/377,980

(22) PCT Filed: Mar. 14, 2013

(86) PCT No.: PCT/JP2013/001740
§ 371 (c)(1),
(2) Date: Aug. 11, 2014

(87) PCT Pub. No.: WO2013/136805
PCT Pub. Date: Sep. 19, 2013

(65) Prior Publication Data
US 2015/0020938 A1    Jan. 22, 2015

(30) Foreign Application Priority Data

Mar. 14, 2012  (JP) .................................. 2012-057700

(51) Int. Cl.
*B60C 11/13*  (2006.01)
*B60C 11/03*  (2006.01)

(52) U.S. Cl.
CPC ........ *B60C 11/1315* (2013.04); *B60C 11/0304* (2013.04); *B60C 11/0309* (2013.04); *B60C 11/1323* (2013.04); *B60C 11/0306* (2013.04); *B60C 2011/039* (2013.04); *B60C 2011/0388* (2013.04)

(58) Field of Classification Search
CPC ...... B60C 11/03; B60C 11/13; B60C 11/0304; B60C 11/0309; B60C 11/1315; B60C 11/1323; B60C 11/1307; B60C 2011/0341; B60C 2011/0353
USPC ................ 152/209.8, 209.9, 209.18, 209.24, 900,152/901
See application file for complete search history.

(56) References Cited

U.S. PATENT DOCUMENTS

| 5,567,253 A | 10/1996 | Iwamura | |
|---|---|---|---|
| 5,735,979 A * | 4/1998 | Secondari | ................. B60C 3/06 152/209.5 |
| 2010/0200134 A1* | 8/2010 | Murata | ............... B60C 11/0306 152/209.9 |
| 2010/0212795 A1* | 8/2010 | Murata | ............... B60C 11/0304 152/209.18 |

(Continued)

FOREIGN PATENT DOCUMENTS

| CN | 101772429 A | 7/2010 |
|---|---|---|
| JP | 7-117414 A | 5/1995 |

(Continued)

OTHER PUBLICATIONS

International Search Report for PCT/JP2013/001740 dated Apr. 9, 2013 [PCT/ISA/210].

(Continued)

*Primary Examiner* — Eric Hug
(74) *Attorney, Agent, or Firm* — Sughrue Mion, PLLC

(57) ABSTRACT

Provided is a pneumatic radial tire which is configured so that circumferential main grooves to be provided on a tread surface are suitably defined in shape.

3 Claims, 6 Drawing Sheets

WIDTH-DIRECTION OUTSIDE ← → WIDTH-DIRECTION INSIDE

(56) References Cited

U.S. PATENT DOCUMENTS

2012/0060987 A1* 3/2012 Nemoto ............. B60C 11/0306
152/209.8
2012/0132333 A1 5/2012 Ebiko et al.

FOREIGN PATENT DOCUMENTS

| JP | 2007-314113 A | 12/2007 |
| JP | 2009-40156 A | 2/2009 |
| JP | 2012-116389 A | 6/2012 |

OTHER PUBLICATIONS

Communication dated Oct. 20, 2015, issued by the European Patent Office in corresponding European Application No. 13761939.1.

* cited by examiner

WIDTH-DIRECTION INSIDE ← → WIDTH-DIRECTION OUTSIDE

PNEUMATIC RADIAL TIRE

CROSS REFERENCE TO RELATED APPLICATIONS

This application is a National Stage of International Application No. PCT/JP2013/001740, filed on Mar. 14, 2013, which claims priority from Japanese Patent Application No. 2012-057700, filed on Mar. 14, 2012, the contents of all of which are incorporated herein by reference in their entirety.

TECHNICAL FIELD

The present invention relates to a pneumatic radial tire, in particular, a pneumatic radial tire that combines both hydroplaning performance during cornering and low-noise performance.

BACKGROUND ART

Conventionally, a pneumatic radial tire is generally formed with a tread pattern having a plurality of main grooves extending in the tread circumferential direction in the tread portion, for the purpose of enhancing braking performance, drivability, and wet performance of the tire.

Here, when the tire is mounted on a vehicle, the tire has a portion installed inside (hereinafter, referred to as vehicle-installed inside) and a portion installed outside (hereinafter, referred to as vehicle-installed outside), which are required to have different performance. In light thereof, it is well known in the art to form a tread pattern asymmetric about the tire equatorial plane.

For example, Patent Literature 1 (PTL 1) discloses a technology of providing a large width circumferential groove on the vehicle-installed outside with respect to the tire equatorial plane, to thereby improve drainage performance in a portion to be placed under an increased contact pressure during cornering so as to enhance hydroplaning performance during cornering.

CITATION LIST

Patent Literature

PTL 1: JP 2007-314113 A

However, there has been a problem involved in the method described in PTL 1 in that the provision of wide grooves leads to deterioration in rigidity of the land portion, with the result that the tire is likely to generate intense noise due to vibration of the land portion during the rolling of the tire, leading to deterioration in low-noise performance.

As described above, it is effective to increase the volume of grooves in order to improve drainage performance. On the other hand, however, the increased volume of grooves leads to degradation of low-noise performance. Thus, there is a contradictory relation between those two properties.

SUMMARY OF INVENTION

Technical Problem

The present invention has been made to solve the aforementioned problem, and has an object of providing a pneumatic radial tire that combines both hydroplaning performance during cornering and low-noise performance.

Solution to Problem

The inventors of the present invention have made extensive studies to solve the aforementioned problem, and have obtained a novel finding that it is effective to make suitable the shapes of the circumferential grooves to be formed in the tread surface, in order to enhance rigidity in the land portion defined by the circumferential grooves while ensuring the contact width of the circumferential groove when in contact with the ground.

The present invention has been made based on the aforementioned finding, and the primary features thereof can be summarized as follows:

a pneumatic radial tire having a tread surface divided into a first half portion and a second half portion across a tire equator as a boundary, the first half portion having a first circumferential main groove extending in the tread circumferential direction, the second half portion having two circumferential main grooves including a second circumferential main groove and a third circumferential main groove both extending in the tread circumferential direction, in which the first circumferential main groove in the first half portion has a groove wall on the tread width direction outside which is inclined relative to the tire radial direction at a larger inclination angle as compared to an inclination angle relative to the tire radial direction of a groove wall on the tread width direction inside, in which, the second circumferential main groove in the second half portion lies inside in the tread width direction and the third circumferential main groove in the second half portion lies outside in the tread width direction, in which, of the two circumferential main grooves in the second half portion, the second circumferential main groove has a groove wall on the tread width direction outside which is inclined relative to the tire radial direction at a larger inclination angle as compared to an inclination angle relative to the tire radial direction of a groove wall on the tread width direction inside, in which, of the two circumferential main grooves in the second half portion, the third circumferential main groove has a groove wall on the tread width direction inside which is inclined at a larger inclination angle relative to the tire radial direction as compared to an inclination angle relative to the tire radial direction of a groove wall on the tread width direction outside.

Advantageous Effect of Invention

The present invention is capable of providing a pneumatic radial tire that is excellent in both hydroplaning performance during cornering and low-noise performance.

BRIEF DESCRIPTION OF DRAWINGS

The present invention will be further described below with reference to the accompanying drawings, wherein.

DESCRIPTION OF EMBODIMENTS

In the following, the present invention is described in detail with reference to the accompanying drawings.

Figure 1:
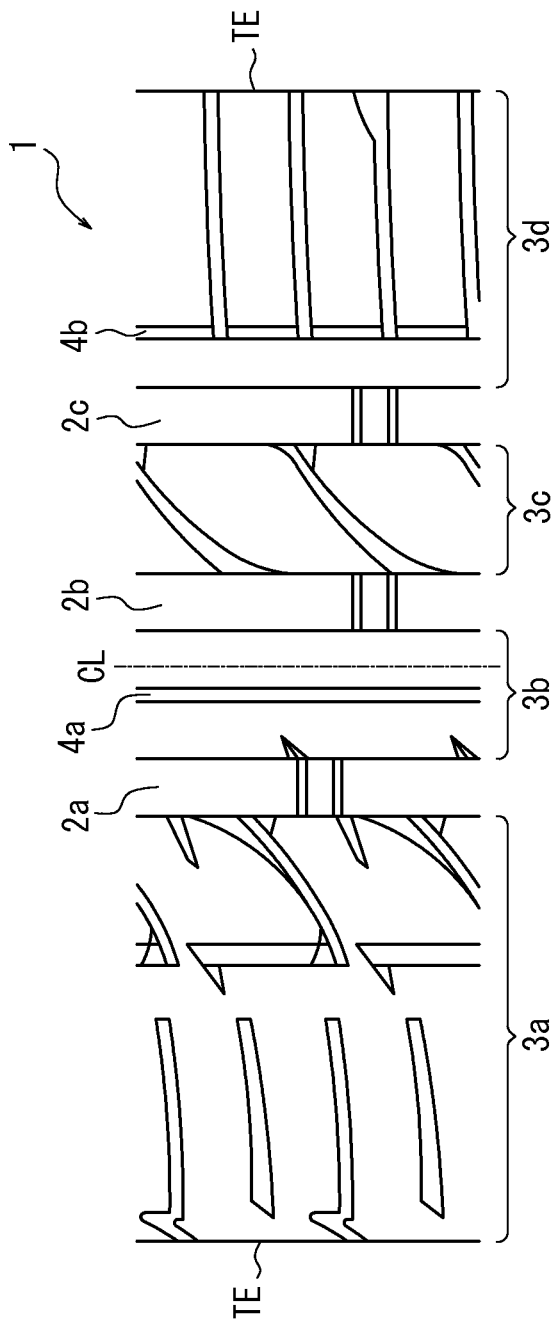
FIG. 1 is a developed view illustrating a tread pattern of a tire according to an embodiment of the present invention.

FIG. 1 is a developed view illustrating a tread pattern of a pneumatic radial tire (hereinafter, simply referred to as tire) according to an embodiment of the present invention.

As illustrated in FIG. 1, the tire of the present invention has a tread surface 1 divided into two half portions across a tire equatorial plane CL as a boundary, and one of the half portions has one main groove 2a extending in the tread circumferential direction.

Meanwhile, the other one of the half portions has two main grooves 2b and 2c extending in the tread circumferential direction.

Further, the circumferential main grooves 2a, 2b, 2c and tread ends TE define four land portion rows 3a, 3b, 3c, 3d.

In other words, the tread end TE and the circumferential main groove 2a define the end-side land portion row 3a, and the tread end TE and the circumferential main groove 2c define the end-side land portion row 3d. Further, the circumferential main groove 2a and the circumferential main groove 2b define the central land portion row 3b, and the circumferential main groove 2b and the circumferential main groove 2c define the intermediate land portion row 3c.

Further, in the illustrated example, the central land portion row 3b is provided with a narrow groove 4a extending in the tread circumferential direction, and the end-side land portion row 3d is provided with a narrow groove 4b extending in the tread circumferential direction.

Figure 2A:
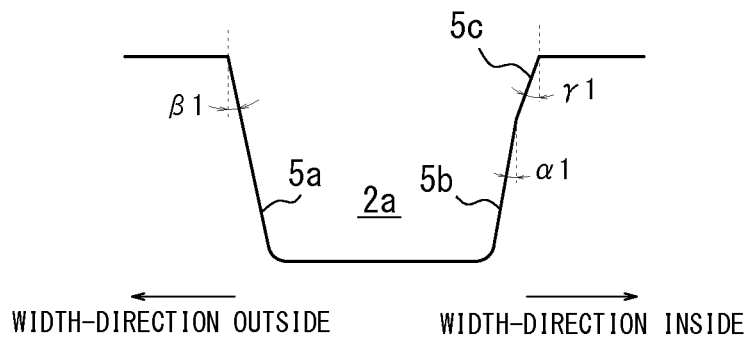
FIGS. 2A to 2C each are a view for illustrating a shape of a circumferential groove.
Figure 2B:
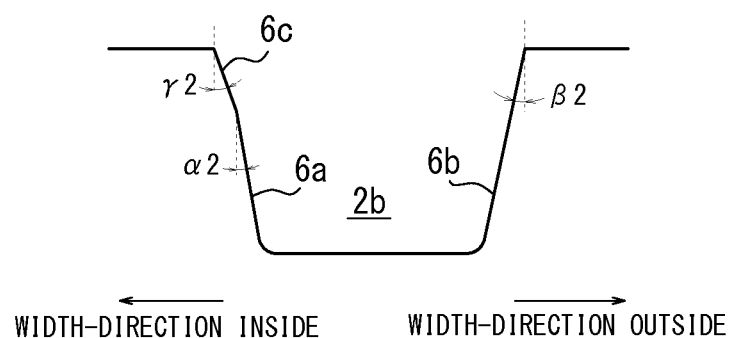
Figure 2C:
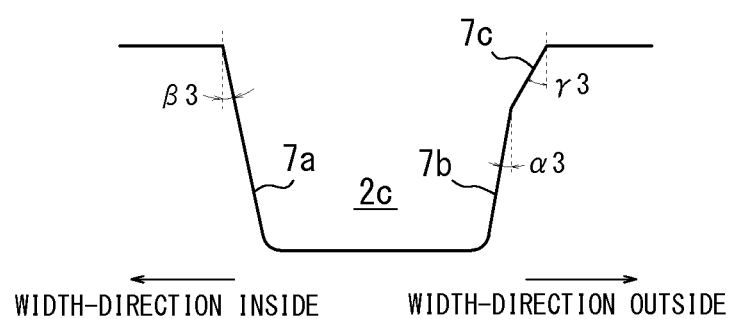

FIGS. 2A, 2B, and 2C are sectional views in the width direction each for illustrating the shapes of the circumferential main grooves 2a, 2b, 2c, respectively.

The circumferential main grooves render the shapes as illustrated FIGS. 2A to 2C, when the tire is incorporated into a specified rim and filled with a specified internal pressure with no load applied thereto.

Here, the specified rim refers to a rim specified in JATMA (The Japan Automobile Tyre Manufacturers Association, Inc) YEAR BOOK 2008, and the specified internal pressure refers to an air pressure associated with the maximum load capacity (maximum load) prescribed by JATMA (The Japan Automobile Tyre Manufacturers Association, Inc) YEAR BOOK 2008. In other countries than Japan, the internal pressure refers to an air pressure associated with the maximum load (maximum load capacity) of a single wheel prescribed in the following standards and the rim refers to a standard rim (or 'Approved Rim' or 'Recommended Rim') prescribed in accordance with the application sizes described in the following standards. The standard varies depending on the industrial standard in each region. Examples thereof include: "The Tire and Rim Association Inc. Year Book" in the United States and "The European Tire and Rim Technical Organization Standards Manual" in Europe.

As illustrated in FIG. 2(A), the circumferential main groove 2a, which is the only one groove formed in one of the half portions, has a groove wall 5a on the tread width direction outside which is inclined at an angle $\beta1(°)$ relative to the tire radial direction and a groove wall 5b on the tire width direction inside which is inclined at an angle $\alpha1(°)$ relative to the tire radial direction the angle, the angle $\beta1(°)$ being larger than the angle $\alpha1(°)$.

Further, of the two circumferential main grooves 2b, 2c in the other one of the half portions, the circumferential main groove 2b lying inside in the tread width direction has a groove wall 6b on the tread width direction outside which is inclined at an angle $\beta2(°)$ relative to the tire radial direction and a groove wall 6b on the tread width direction inside which is inclined at an angle $\alpha2(°)$ relative to the tire radial direction, the angle $\beta2(°)$ being larger than the angle $\alpha2(°)$.

Further, of the two circumferential main grooves in the other one of the half portions, the circumferential main groove 2c lying outside in the tread width direction has a groove wall 7a on the tread width direction inside which is inclined at an angle $\beta3(°)$ relative to the tire radial direction and a groove wall 7b on the tread width direction outside which is inclined at an angle $\alpha3(°)$ relative to the tire radial direction, the angle $\beta3(°)$ being larger than the angle $\alpha3(°)$.

As described above, according to the present invention, it is essential that, in a circumferential main groove in one of the half portions of the tread surface across the tire equatorial plane as a boundary, a groove wall on the width direction outside has a larger inclination angle relative to the tire radial direction as compared to the inclination angle relative to the tire radial direction of a groove wall on the tread width direction inside.

It is also essential that: of the two circumferential main grooves in the other one of the half portions, the circumferential main groove lying inside in the tread width direction has a groove wall on the tread width direction outside inclined relative to the tire radial direction at a larger inclination angle as compared to the inclination angle relative to the tire radial direction of a groove wall on the tread width direction inside; on the other hand, of the two circumferential main grooves in the other one of the half portions, the circumferential main groove lying outside in the tread width direction has a groove wall on the tread width direction inside inclined at a larger inclination angle relative to the tire radial direction as compared to the inclination angle relative to the tire radial direction of a groove wall on the tread width direction outside.

Here, for example, in the example illustrated in FIG. 2(A), the groove wall 5b on the tire width direction inside has an inclination angle of $\alpha1(°)$ in an inside portion in the tire radial direction and has an inclination angle of $\gamma1(°)$ in an outside portion in the tire radial direction. In other words, the groove wall 5b on the tire width direction inside has a tapered portion 5c. The inclination angles $\alpha$, $\beta$, and $\gamma$ are in a relation of $\alpha<\beta<\gamma$ in the illustrated example.

As described above, in the case where the angle of the groove wall varies depending on the radial position, for example, in the case of forming a tapered portion on the radial direction outside (in the vicinity of the opening of the groove), the inclination angle of the groove wall on the most inner side in the radial direction may be referred to when comparing the inclination angles relative to the tire radial direction between a groove wall on the tire width direction inside and a groove wall on the tire width direction outside.

Hereinafter, operations and effects of the present invention are described with reference to a case where the tire of the present invention is mounted on a vehicle in such a manner that the one of the half portions that has only one circumferential main groove is disposed on the vehicle-installed outside.

According to the present invention, first, in the half portion located on the vehicle-installed outside, the one circumferential groove has a groove wall on the width direction outside inclined at a larger inclination angle than the inclination angle of another groove wall on the width direction inside, so as to ensure rigidity of the end-side land portion row 3a while increasing the groove width of the circumferential groove when in contact with the ground.

With this configuration, the land portion row 3a to be positioned on the vehicle-installed outside where the contact pressure particularly increases during cornering can be ensured in rigidity so as to suppress noise generation, while hydroplaning performance during cornering can also be improved through increased drainage performance on the vehicle-installed outside where the contact pressure particularly increases during cornering.

Further, according to the present invention, as to the two circumferential main grooves in the half portion on the vehicle-installed inside, the groove wall on the width direction outside of the circumferential main groove lying inside in the width direction and the groove wall on the width direction inside of the circumferential main groove lying outside in the width direction are both configured to have a large inclination angle relative to the tire radial direction, so as to ensure rigidity in the intermediate land portion row 3c while increasing the groove width of the two circumferential main grooves when in contact with the ground.

This configuration allows for further improving hydroplaning performance during cornering by increasing drainage performance, and also allows for ensuring rigidity in the intermediate land portion row on the vehicle-installed inside which is otherwise susceptible to deterioration in rigidity as being defined by two circumferential main grooves, to thereby further suppress noise generation.

Further, the central land portion row 3b is likely to float on both ends thereof in the width direction when coming into contact with ground, as compared to the end-side land portion row 3a and the intermediate land portion row 3c in which rigidity is ensured, and thus, for the purpose of weight reduction of the tire, the groove walls may preferably be formed with the tapered portions 5c, 6c as illustrated in FIGS. 2A, 2B.

Specifically, the groove wall 5b on the width direction inside of the circumferential main groove 2a may preferably have the tapered portion 5c having a large inclination angle relative to the tire radial direction, and the groove wall 6a on the width direction inside of the circumferential main groove 2b may preferably have the tapered portion 6c having a large inclination angle relative to the tire radial direction.

Further, the groove wall 7b on the width direction outside of the circumferential main groove 2c may preferably have a tapered portion 7c having a large inclination angle relative to the tire radial direction for the following reason.

That is, a block on the opposite side of another block ensured in rigidity is relatively likely to float on both ends thereof when coming into contact with the ground, and it is preferred to eliminate in advance such excessive portions to float.

Here, as to the shapes of the circumferential main grooves illustrated in FIGS. 2A to 2C, the inclination angle $\alpha 1(°)$ of the groove wall on the width direction inside of the circumferential main groove 2a relative to the tire radial direction may preferably be defined as 0° to 20°, and the inclination angle $\beta 1(°)$ of the groove wall on the width direction outside of the circumferential main groove 2a relative to the tire radial direction may preferably be defined as 0° to 20°. The inclination angle $\gamma 1(°)$ of the tapered portion 5c relative to the tire radial direction may preferably be defined as 15° to 40°.

Further, the inclination angle $\alpha 2(°)$ of the groove wall on the width direction inside of the circumferential main groove 2b relative to the tire radial direction may preferably be defined as 0° to 20°, and the inclination angle $\beta 2(°)$ of the groove wall on the width direction outside of the circumferential main groove 2b relative to the tire radial direction may preferably be defined as 0° to 20°. The inclination angle $\gamma 2(°)$ of the tapered portion 6c relative to the tire radial direction may preferably be defined as 15° to 40°.

In addition, the inclination angle $\alpha 3(°)$ of the groove wall on the width direction outside of the circumferential main groove 2c relative to the tire radial direction may preferably be defined as 0° to 20°, and the inclination angle $\beta 3(°)$ of the groove wall on the width direction inside of the circumferential main groove 2c relative to the tire radial direction may preferably be defined as 0° to 20°. The inclination angle $\gamma 3(°)$ of the tapered portion 7c relative to the tire radial direction may preferably be defined as 15° to 40°.

Figure 3A:
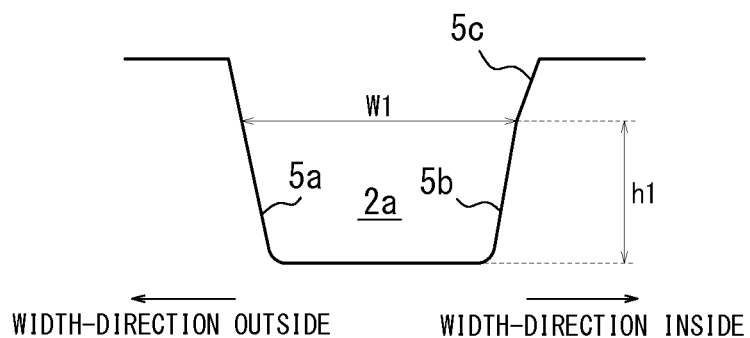
FIGS. 3A to 3C each are a view for illustrating the groove width and the groove depth of the circumferential groove.
Figure 3B:
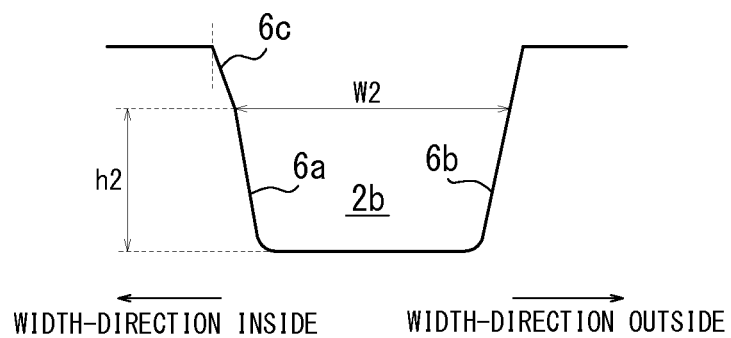
Figure 3C:
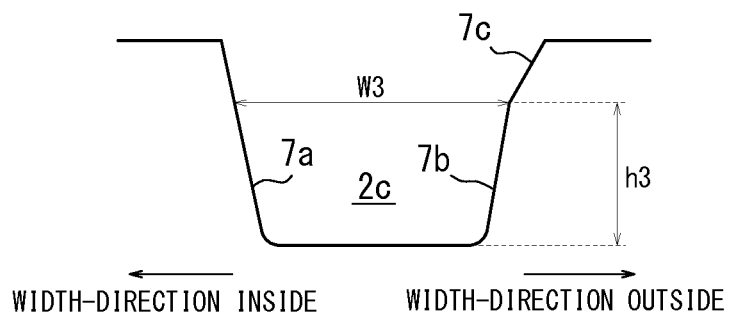

FIGS. 3A to 3C each are a view for illustrating the groove width and the groove depth of the circumferential groove, the width and depth being obtained when the tire is incorporated into a specified rim and filled with a specified internal pressure with a load of 80% of the maximum permissible load being applied thereto.

As illustrated in FIG. 3B, the circumferential main groove 2b is preferably larger in groove width than the other two circumferential main grooves 2a, 2c. The groove width W2 of the circumferential main groove 2b may preferably have a length equal to 7% to 8% of the tire contact width to be obtained when the tire is incorporated into a specified rim and filled with a specified internal pressure with a load of 80% of the maximum permissible load being applied thereto for the following reason.

That is, the aforementioned configuration can increase drainage performance in the vicinity of the tread center portion, to thereby further improve hydroplaning performance during cornering.

The circumferential main groove 2a may preferably have a groove width W1 (mm) of 7 mm to 15 mm and a groove depth h1 (mm) of 6 mm to 10 mm.

Further, the circumferential main groove 2b may preferably have a groove width W2 (mm) of 7 mm to 15 mm and a groove depth h2 (mm) of 6 mm to 10 mm.

In addition, the circumferential main groove 2c may preferably have a groove width W3 (mm) of 7 mm to 15 mm and a groove depth h3 (mm) of 6 mm to 10 mm.

Here, the groove width of the circumferential main groove refers to a groove width at the opening of the groove. However, when the groove width has a tapered portion as illustrated in FIGS. 3A to 3C, the groove width refers to a groove width at a radially inside end position of the tapered portion.

Further, the groove depth of the circumferential main groove refers to a radial height from the groove bottom to the opening. However, when the groove wall has a tapered portion as illustrated in FIGS. 3A to 3C, the groove depth refers to a radial height from the groove bottom to a radially inside end position of the tapered portion.

Further, according to the present invention, the central land portion row 3b may preferably be provided with a circumferential narrow groove 4a extending in the tire circumferential direction, as illustrated in FIG. 1.

The reason is that it can further enhance drainage performance in the vicinity of the tread center portion.

Here, FIG. 4 illustrate shapes of the circumferential narrow groove when the tire is incorporated into a specified rim and filled with a specified internal pressure with no load applied thereto, and FIG. 5 illustrate the groove width and the groove depth of the circumferential narrow groove to be obtained when the tire is incorporated into a specified rim and filled with a specified internal pressure with a load of 80% of the maximum permissible load being applied thereto.

Figure 4A:
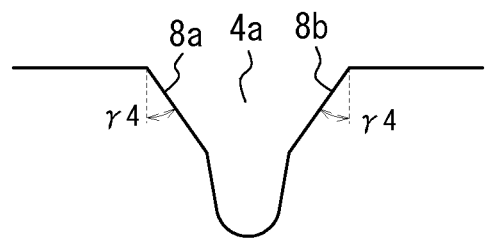
FIGS. 4A and 4B each are a view for illustrating a shape of a circumferential narrow groove.

Further, as illustrated in FIG. 4A, the groove walls on both sides of the circumferential narrow groove 4a each may preferably have tapered portions 8a, 8b, respectively.

The reason is to suppress to minimum the deterioration in rigidity in the central land portion row resulting from the provision of the circumferential narrow groove 4a.

Here, the inclination angles of the tapered portions 8a, 8b relative to the tire radial direction each may preferably be 30° to 60°.

Further, the circumferential narrow groove 4a may preferably have a groove width W4 of 3 mm to 6 mm and a groove height h4 of 2 mm to 4 mm.

In addition, in the present invention, the end-side land portion row 4d may preferably be provided with a circumferential narrow groove 4b extending in the tread circumferential direction.

The reason is that the end-side land portion can circumferentially be curved due to the presence of the narrow groove when brought into contact with the ground, which improves grounding property.

Figure 4B:
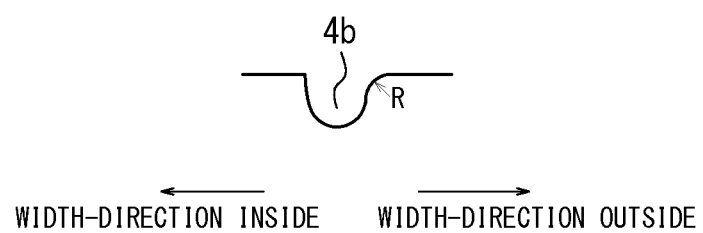

Further, as illustrated in FIG. 4B, the groove wall on the width direction outside of the circumferential narrow groove 4b may preferably be in a curved shape in the vicinity of the opening.

The reason is that the contact pressure is increased unless curved in the vicinity of the opening, and it is more preferred to have the contact pressure uniformized.

At this time, the curved portion may preferably have a curvature radius R of 1 mm to 3 mm.

Figure 5A:
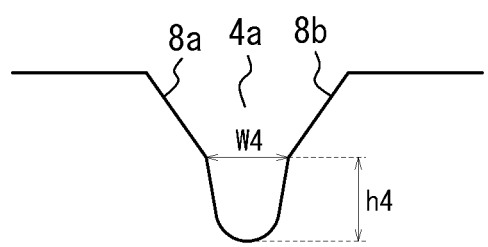
FIGS. 5A and 5B each are a view for illustrating the groove width and the groove depth of the circumferential narrow groove.
Figure 5B:
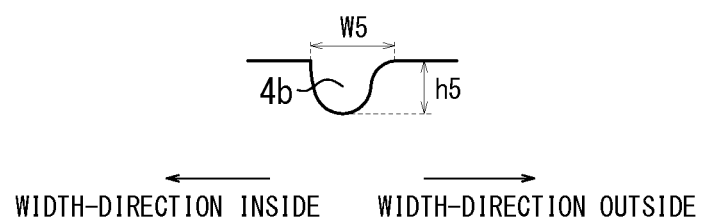

Further, as illustrated in FIG. 5B, the circumferential narrow groove 4b may preferably have a groove width W5 of 2 mm to 4 mm and a groove depth h5 of 1 mm to 3 mm.

EXAMPLES

In order to verify the effects of the present invention, a plurality of tires having the tread pattern of the type illustrated in FIG. 1 were used, which were tested for comparing the tires in performance.

Prototyped as tires according to Inventive Examples 1 to 3 were those in which the inclination angle of the groove wall of the circumferential main groove relative to the tire radial direction was suitably defined.

In a tire prepared as Conventional Example, the groove walls on the width direction outside and inside of the circumferential main groove have the same inclination angle relative to the tire radial direction.

Table 1 shows specifications of each tire.

In Table 1, "Tire Contact Width when in Ground Contact" refers to a tire contact width to be obtained when the tire is incorporated in a specified rim and filled with an internal pressure of 260 kPa with a load of 5.10 kN (corresponding to 80% of the maximum permissible load) being applied thereto.

Further, in Table 1, the groove width of the circumferential main groove refers to a groove width to be obtained when the tire is incorporated in a specified rim and filled with an internal pressure of 260 kPa with a load of 5.10 kN being applied thereto.

Here, the circumferential main grooves 2a to 2c of Inventive Examples 1 to 3 and of Conventional Example share the same groove volume of 246 mm³ in common when the tire is incorporated in a specified rim and filled with an internal pressure of 260 kPa with a load of 5.10 kN being applied thereto.

Here, the circumferential main groove 2a has a groove wall on the width direction inside inclined relative to the tire radial direction at the inclination angle α1 of 10°, a groove wall on the width direction outside inclined relative to the tire radial direction at the inclination angle β1 of 12°, a groove wall on the width direction outside inclined relative to the tire radial direction at the inclination angle β1 of 12°, and a tapered portion inclined relative to the tire radial direction at the inclination angle γ1 of 20°.

The circumferential main groove 2b has a groove wall on the width direction inside inclined relative to the tire radial direction at the inclination angle α2 of 10°, a groove wall on the width direction outside inclined relative to the tire radial direction at the inclination angle β2 of 12°, and a tapered portion inclined relative to the tire radial direction at the inclination angle γ2 of 20°.

Further, the circumferential main groove 2c has a groove wall on the width direction inside inclined relative to the tire radial direction at the inclination angle α3 of 10°, a groove wall on the width direction outside inclined relative to the tire radial direction at the inclination angle β3 of 12°, and a tapered portion inclined relative to the tire radial direction at the inclination angle γ3 of 30°.

Here, the circumferential narrow groove 4a has a shape shown in FIG. 4A or 5A, where the inclination angle γ4 of the tapered portion relative to the tire radial direction is 45°, the groove width W4 is 3.6 mm, and the groove depth h4 is 2.2 mm, which are shared in common by each tire. The circumferential narrow groove 4b has a shape shown in FIG. 4B or 5B, where the groove width W5 is 3 mm, and the groove depth h5 is 2 mm, and the curvature radius of the curved portion is 1 mm, which are shared in common by each tire.

TABLE 1

Figure 6A:
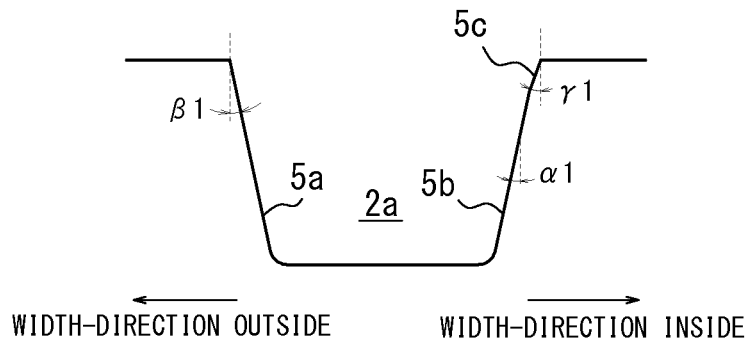
FIGS. 6A to 6C each are a sectional view showing a shape of a circumferential groove of a conventional tire.
Figure 6B:
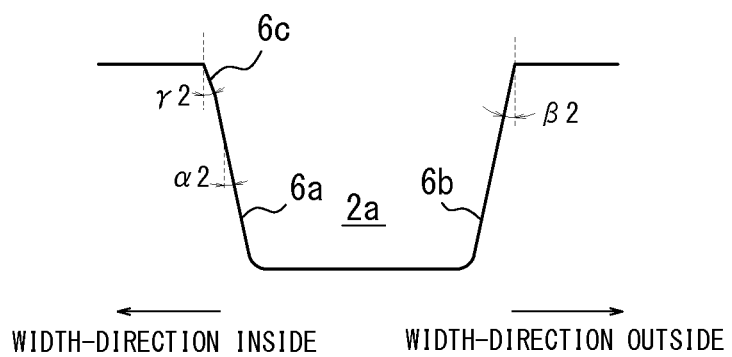
Figure 6C:
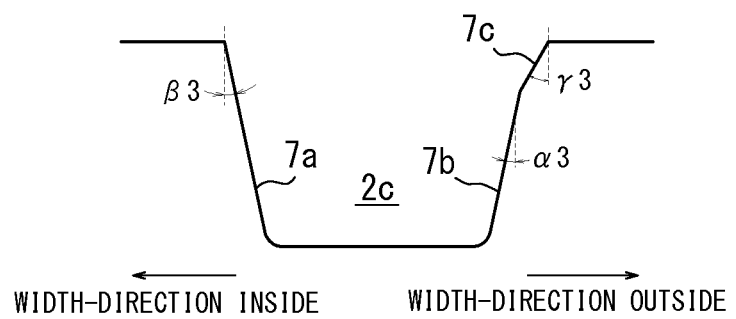

| | Inventive Example 1 | Inventive Example 2 | Inventive Example 3 | Conventional Example |
|---|---|---|---|---|
| Tread Pattern | FIG. 1 | FIG. 1 | FIG. 1 | FIG. 1 |
| Main Groove Shape | FIG. 2 | FIG. 2 | FIG. 2 | FIG. 6 |
| Tire Contact Width (mm) when in Ground Contact | 190 | 190 | 190 | 190 |
| Groove Width (mm) of Circumferential Main Groove 2a | 12.1 | 12.1 | 12.1 | 12.8 |
| Groove Width (mm) of Circumferential Main Groove 2b | 14.1 | 12.1 | 15.5 | 12.8 |
| Groove Width (mm) of Circumferential Main Groove 2c | 11.5 | 11.5 | 11.5 | 12.1 |

The aforementioned tires each in a tire size of 225/40R19 were subjected to test for evaluating hydroplaning performance during cornering and low-noise performance.

Here, the aforementioned tires were each mounted on a vehicle in such a manner that the one of the half portions that has only one circumferential main groove is positioned on the vehicle-installed outside.

<Hydroplaning Performance During Cornering>

The tires each having a negative camber of 0.5° were mounted on a vehicle, and the vehicle was caused to enter a pool with a water depth of 6 mm on a corner with a radius of 100 m at respective speeds of 65, 70, 75, 80, 85 km/h, so as to measure the lateral acceleration applied to the vehicle in the pool, and the lateral accelerations measured by testing the tires at the respective cornering speeds of 65, 70, 75, 80, 85 km/h were added up so as to be subjected to index evaluation. Table 2 shows the results thereof. In the evaluation results shown Table 2, a larger numeric value means better performance.
<Low-Noise Performance>

The pass-by noise level was measured according to the conditions defined by the European pass-by noise regulation.

TABLE 2

|  | Reference Value | Inventive Example 1 | Inventive Example 2 | Inventive Example 3 | Conventional Example |
|---|---|---|---|---|---|
| Hydroplaning Performance during Cornering | 85 | 90 | 86 | 92 | 65 |
| Low-Noise Performance | below 67.1 dB | 66.8 dB | 66.5 dB | 67.0 dB | 67.2 dB |

As shown in Table 2, it can be appreciated that the tire according to Conventional Example failed to satisfy the reference values for both hydroplaning performance during cornering and low-noise performance, while the tires according to Inventive Examples 1 to 3 all exceeded the reference values for both hydroplaning performance during cornering and low-noise performance.

It can be appreciated from the comparison of Inventive Example 1 with Inventive Example 2 that Inventive Example 1, which has the groove width of the circumferential main groove 2b suitably defined in relation to the groove widths of the other main grooves, is more excellent than Inventive Example 2 in hydroplaning performance during cornering.

Further, it can be appreciated from the comparison of Inventive Example 1 with Inventive Examples 2, 3 that Inventive Example 1, which has the groove width of the circumferential main groove 2b suitably defined in relation to the contact width, is more excellent than Inventive Example 2 in drainage performance, and more excellent than Inventive Example 3 in low-noise performance.

REFERENCE SIGNS LIST 1 tread surface
2a, 2b, 2c circumferential main groove
3a end-side land portion row
3b central land portion row
3c intermediate land portion row
3d end-side land portion row
4a, 4b circumferential narrow groove
5a, 5b, 6a, 6b, 7a, 7b groove wall
5c, 6c, 7c, 8a, 8b tapered portion

The invention claimed is:

1. A pneumatic radial tire having a tread surface divided into a first half portion and a second half portion across a tire equator as a boundary, the first half portion having a first circumferential main groove extending in the tread circumferential direction, the second half portion having two circumferential main grooves including a second circumferential main groove and a third circumferential main groove both extending in the tread circumferential direction,
wherein the first circumferential main groove in the first half portion has a first groove wall on the tread width direction outside which is inclined relative to the tire radial direction at a larger inclination angle as compared to an inclination angle relative to the tire radial direction of a second groove wall on the tread width direction inside,
wherein, the second circumferential main groove in the second half portion lies inside in the tread width direction and the third circumferential main groove in the second half portion lies outside in the tread width direction,
wherein, of the two circumferential main grooves in the second half portion, the second circumferential main groove has a first groove wall on the tread width direction outside which is inclined relative to the tire radial direction at a larger inclination angle as compared to an inclination angle relative to the tire radial direction of a second groove wall on the tread width direction inside,
wherein, of the two circumferential main grooves in the second half portion, the third circumferential main groove has a second groove wall on the tread width direction inside which is inclined at a larger inclination angle relative to the tire radial direction as compared to an inclination angle relative to the tire radial direction of a first groove wall on the tread width direction outside, and
wherein:
in the first circumferential main groove in the first half portion, a first tapered portion having a larger inclination angle relative to the tire radial direction than the first and the second groove walls of the first circumferential main groove is provided only on the second groove wall on the tread width direction inside of the first circumferential main groove in the first half portion,
in the second circumferential main groove of the two circumferential main grooves in the second half portion, a second tapered portion having a larger inclination angle relative to the tire radial direction than the first and the second groove walls of the second circumferential main groove is provided only on the second groove wall on the tread width direction inside of the second circumferential main groove in the second half portion, and
in the third circumferential main groove of the two circumferential main grooves in the second half portion, a third tapered portion having a larger inclination angle relative to the tire radial direction than the first and the second groove walls of the third circumferential main groove is provided only on the first groove wall on the tread width direction outside of the third circumferential main groove in the second half portion.

2. The pneumatic radial tire according to claim 1, wherein, of the two circumferential main grooves in the second half portion, the second circumferential main groove is larger in groove width than the first circumferential main groove in the first half portion and the third circumferential main groove in the second half portion.

3. The pneumatic radial tire according to claim 1 or 2, wherein, of the two circumferential main grooves in the second half portion, the second circumferential main groove has a groove width equal to 7% to 8% of a tire contact width obtained when the tire is incorporated into a specified rim and filled with a specified internal pressure with a load of 80% of the maximum permissible load being applied thereto.

\* \* \* \* \*